United States Patent
Sultana et al.

(10) Patent No.: US 9,988,942 B2
(45) Date of Patent: Jun. 5, 2018

(54) AIR EXHAUST TUBE HOLDER IN A TURBOMACHINE

(71) Applicant: SNECMA, Paris (FR)

(72) Inventors: Patrick Sultana, Moissy Cramayel (FR); Boucif Bensalah, Moissy Cramayel (FR); Yannick Durand, Moissy Cramayel (FR); Olivier Renon, Moissy Cramayel (FR)

(73) Assignee: SNECMA, Paris (FR)

( * ) Notice: Subject to any disclaimer, the term of this patent is extended or adjusted under 35 U.S.C. 154(b) by 114 days.

(21) Appl. No.: 14/441,947

(22) PCT Filed: Nov. 7, 2013

(86) PCT No.: PCT/FR2013/052663
§ 371 (c)(1),
(2) Date: May 11, 2015

(87) PCT Pub. No.: WO2014/072643
PCT Pub. Date: May 15, 2014

(65) Prior Publication Data
US 2015/0285100 A1 Oct. 8, 2015

(30) Foreign Application Priority Data
Nov. 12, 2012 (FR) .................... 12 60747

(51) Int. Cl.
*F01D 25/28* (2006.01)
*F01D 25/30* (2006.01)
(Continued)

(52) U.S. Cl.
CPC ............. *F01D 25/28* (2013.01); *F01D 25/30* (2013.01); *F01M 13/00* (2013.01); *F02K 1/04* (2013.01);
(Continued)

(58) Field of Classification Search
CPC . A47B 2200/0032; F01D 25/28; F01D 25/30; F01D 9/02; F02D 1/04;
(Continued)

(56) References Cited

U.S. PATENT DOCUMENTS 7,384,199 B2   6/2008 Allmon et al.
2004/0088989 A1   5/2004 Dowman
(Continued)

FOREIGN PATENT DOCUMENTS

EP   1 902 951 A1   3/2008
EP   2 261 468 A1   12/2010
(Continued)

OTHER PUBLICATIONS

U.S. Appl. No. 14/441,964, filed May 11, 2015, Sultana, et al.
International Search Report dated May 22, 2014, in PCT/FR2013/052663, filed Nov. 7, 2013.

*Primary Examiner* — Adriana Figueroa
*Assistant Examiner* — Jessie T Fonseca
(74) *Attorney, Agent, or Firm* — Oblon, McClelland, Maier & Neustadt, L.L.P.

(57) ABSTRACT

A support for carrying a tube for discharging oil-laden air from a turbine engine, the support including a radially inner annular portion for mounting around the tube, and fins extending outwards in a radial plane from the annular portion, each fin forming an angle relative to the radial direction. The fins have fastener zones at their outer peripheries, the fastener zones being inclined in the axial direction of the support so as to be suitable for fastening to an exhaust cone of the turbine engine.

9 Claims, 4 Drawing Sheets

(51) Int. Cl.
  *F01M 13/00* (2006.01)
  *F02K 1/04* (2006.01)
(52) U.S. Cl.
  CPC .. *F05D 2230/642* (2013.01); *F05D 2250/314* (2013.01); *F05D 2250/322* (2013.01); *F05D 2260/609* (2013.01); *Y02T 50/671* (2013.01)
(58) Field of Classification Search
  CPC . F01M 13/00; F02C 7/20; F16B 2/243; F16L 3/1222; F16L 3/233; F16L 3/08; F05D 2260/602; F05D 2260/605; F05D 2260/608; F05D 2260/609; F05D 2250/322; F05D 2230/642; F05D 2250/314; F02K 1/04; Y02T 50/671
  USPC ............... 248/230.1, 431, 674, 680, 523, 65
  See application file for complete search history.

(56) References Cited

U.S. PATENT DOCUMENTS

| | | | |
|---|---|---|---|
| 2008/0067287 A1 | 3/2008 | Guibert et al. | |
| 2008/0310958 A1* | 12/2008 | Bader | F01D 9/065 415/208.2 |
| 2010/0275614 A1* | 11/2010 | Fontaine | F01D 25/162 60/797 |
| 2011/0020116 A1 | 1/2011 | Hashimoto et al. | |
| 2011/0162383 A1 | 7/2011 | Zhang et al. | |
| 2011/0214433 A1* | 9/2011 | Feindel | F01D 25/162 60/796 |
| 2011/0271686 A1 | 11/2011 | Francisco et al. | |
| 2011/0302929 A1* | 12/2011 | Bruhwiler | F01D 9/044 60/796 |
| 2013/0189088 A1* | 7/2013 | Nanda | F01D 25/30 415/177 |
| 2014/0026590 A1* | 1/2014 | Alholm | F02K 3/10 60/796 |
| 2015/0267565 A1* | 9/2015 | Tozzi | F01D 25/30 415/211.2 |

FOREIGN PATENT DOCUMENTS

| | | |
|---|---|---|
| JP | 52-39125 B1 | 10/1977 |
| JP | 2004-514841 A | 5/2004 |
| JP | 2009-174528 A | 8/2009 |
| JP | 2009-243311 A | 10/2009 |
| JP | 2011-511905 A | 4/2011 |
| JP | 2011-525955 A | 9/2011 |

* cited by examiner

AIR EXHAUST TUBE HOLDER IN A TURBOMACHINE

BACKGROUND OF THE INVENTION

Field of the Invention

The present invention relates to a support for a tube for discharging oil-laden air from a turbine engine.

Description of the Related Art

In conventional manner, a turbine engine, such as a turboprop or a turbojet, comprises from upstream to downstream in the gas flow direction: a fan; a low pressure compressor; a high pressure compressor; a combustion chamber; a high pressure turbine; a low pressure turbine; and a gas exhaust nozzle. Each compressor stage corresponds to a turbine stage, with the two stages being connected together by a shaft so as to form a spool, in particular a low pressure spool and a high pressure spool.

The shaft of the low pressure spool may be hollow and may contain a tube that is commonly referred to as the center vent tube (CVT). This tube has an upstream portion that is movable in rotation and that is extended by a downstream portion that does not rotate and that serves to discharge oil-laden air coming from certain enclosures in the turbine engine.

The downstream portion of the tube passes through an exhaust cone to which it is connected by a support comprising an inner annular portion of generally omega-shaped section that surrounds the tube, and a conical portion that is fastened to the exhaust cone and to the inner annular portion. The conical portion has holes for passing a flow of cooling air that passes through the exhaust cone. In addition, the conical portion of the support is fastened to the inner annular portion by means of screws.

Such a support presents the following drawbacks.

Firstly, the zone where the tube bears against the support is offset axially from the zone where the support is fastened to the exhaust cone, thereby greatly reducing the stiffness of the support. This stiffness is further reduced by the presence of holes enabling the flow of cooling air to pass through.

The exhaust cone is subjected to temperatures lying in the range 650° C. to 680° C., while the tube may be at a temperature lying in the range 450° C. to 480° C. This large temperature difference (240° C.) gives rise to thermal expansion phenomena, to stresses, and to movements, that the support must be capable of absorbing while conserving its stiffness qualities.

In order to achieve such a compromise, the prior art support is relatively heavy, thereby increasing the total weight of the turbine engine, and in addition it is expensive.

BRIEF SUMMARY OF THE INVENTION

A particular object of the present invention is to provide a solution to this problem that is simple, effective, and inexpensive.

To this end, the invention provides a support for carrying a tube for discharging oil-laden air from a turbine engine, the support comprising a radially inner annular portion for mounting around said tube and being characterized in that it includes fins extending outwards in a radial plane from the annular portion, each fin forming an angle relative to the radial direction, the fins having fastener zones at their outer peripheries, said fastener zones being inclined in the axial direction of the support so as to be suitable for fastening to an exhaust cone of the turbine engine.

In this way, the zone where the tube bears against the support is situated axially in register with the zone where the support is fastened to the exhaust cone, thereby enabling the support to have good stiffness. The fact that the fins slope relative to the radial direction also makes it possible to accommodate appropriately the effects of thermal expansion that may occur in operation. Finally, such a support is relatively lightweight, it allows cooling air to pass through the exhaust cone, and it is inexpensive. By way of comparison, such a support weighs about one-tenth the weight of the prior art support.

According to a characteristic of the invention, each of the fastener zones presents the shape of a portion of a cone.

Furthermore, each fin may have a middle zone with a first end connected to an inner fastener zone for fastening to the inner annular portion of the support, and a second end connected to the outer fastener zone for fastening to the exhaust cone, the middle zone extending in a plane forming an angle that is not a right angle relative to the tangent to the annular portion passing through the first end.

Such a characteristic enables the support to accommodate effectively the effects of thermal expansions.

Each middle zone may extend in a plane parallel to the axis of the inner annular portion.

The middle zones thus offer little resistance to the stream of air passing through the exhaust cone.

In addition, each inner fastener zone is of a shape complementary to the shape of the inner annular portion.

The inner zones of the fins may be fastened to the inner annular zone, e.g. by brazing.

Advantageously, the fins and the inner annular portion are made of a nickel-based superalloy, e.g. out of Inconel 625 or out of Inconel 718.

Preferably, the length of the inner annular portion is less than or equal to 0.4 times its inside diameter.

In this way, the inner annular portion forms a short guide that constitutes, to some extent, a ball joint connection between the tube and the support.

By way of example, the number of fins may lie in the range three to ten.

The invention also provides an assembly for a turbine engine having a tube for discharging oil-laden air, said tube comprising an upstream portion that is movable in rotation and a downstream portion that does not rotate, said downstream portion passing through an exhaust cone and extending along the axis of said exhaust cone, said downstream portion being surrounded by the inner annular portion of a support of the above-specified type so that said downstream portion is mounted to be free to move axially in translation and in rotation in said inner annular portion, the sloping fastener zones of the support also being fastened to the exhaust cone.

Finally, the invention provides a turbine engine, characterized in that it includes an assembly as described above.

BRIEF DESCRIPTION OF THE SEVERAL VIEWS OF THE DRAWINGS

The invention can be better understood and other details, characteristics, and advantages of the invention appear on reading the following description made by way of non-limiting example and with reference to the accompanying drawings, in which.

DETAILED DESCRIPTION OF THE INVENTION

Figure 1:
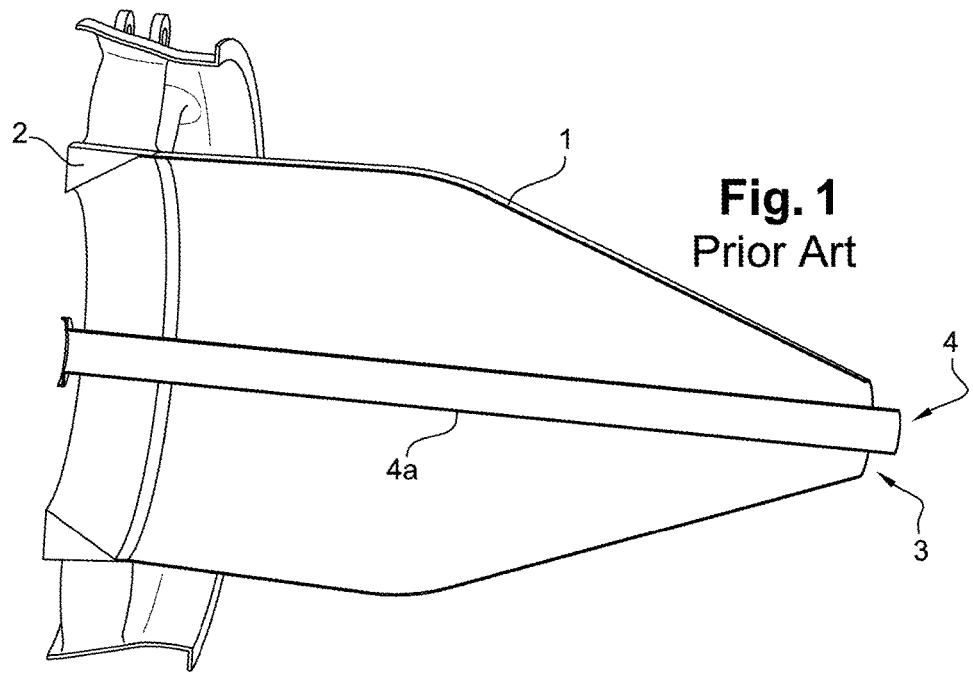
FIG. 1 is a perspective view in axial section of a portion of a prior art turbine engine.

A downstream portion of a prior art turbine engine is shown in FIG. 1 and comprises an exhaust cone 1 fastened downstream from an exhaust casing 2, itself situated downstream from a low pressure turbine (not shown). The exhaust cone 1 has an axial opening 3 at its downstream end.

The turbine engine also has a tube 4 commonly referred to as a center vent tube (CVT) that has an upstream portion that is movable in rotation (not shown) and that is extended by a non-rotary downstream portion 4a for the purpose of discharging oil-laden air coming from certain enclosures within the turbine engine.

Figure 2:
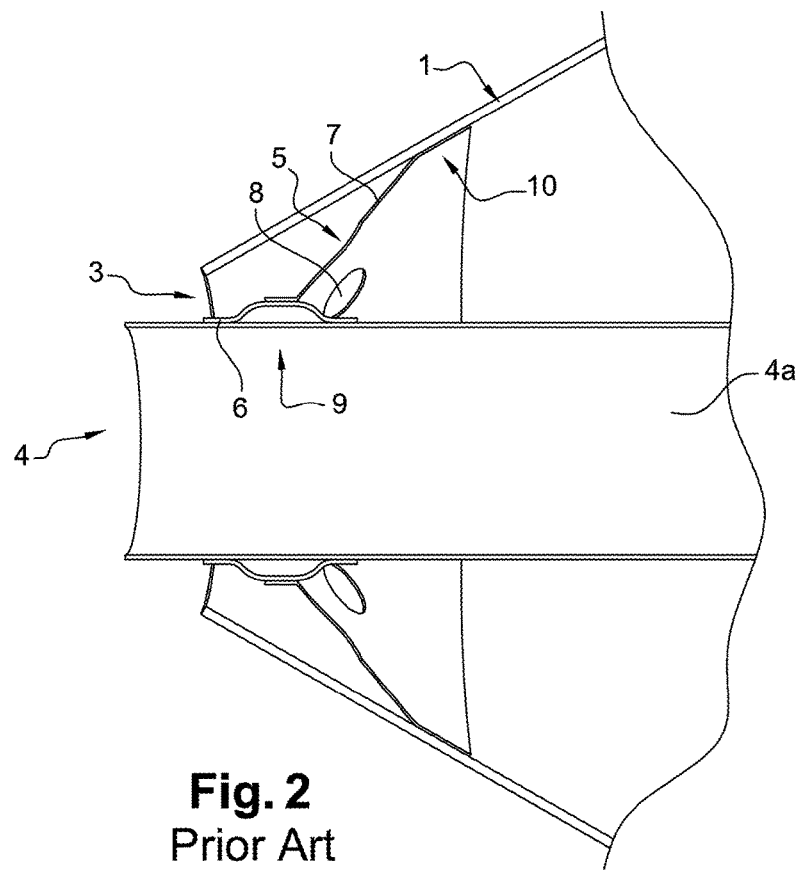
FIG. 2 is an axial section view showing how a prior art support is mounted between an exhaust cone and a tube for discharging oil-laden air.
Figure 3:
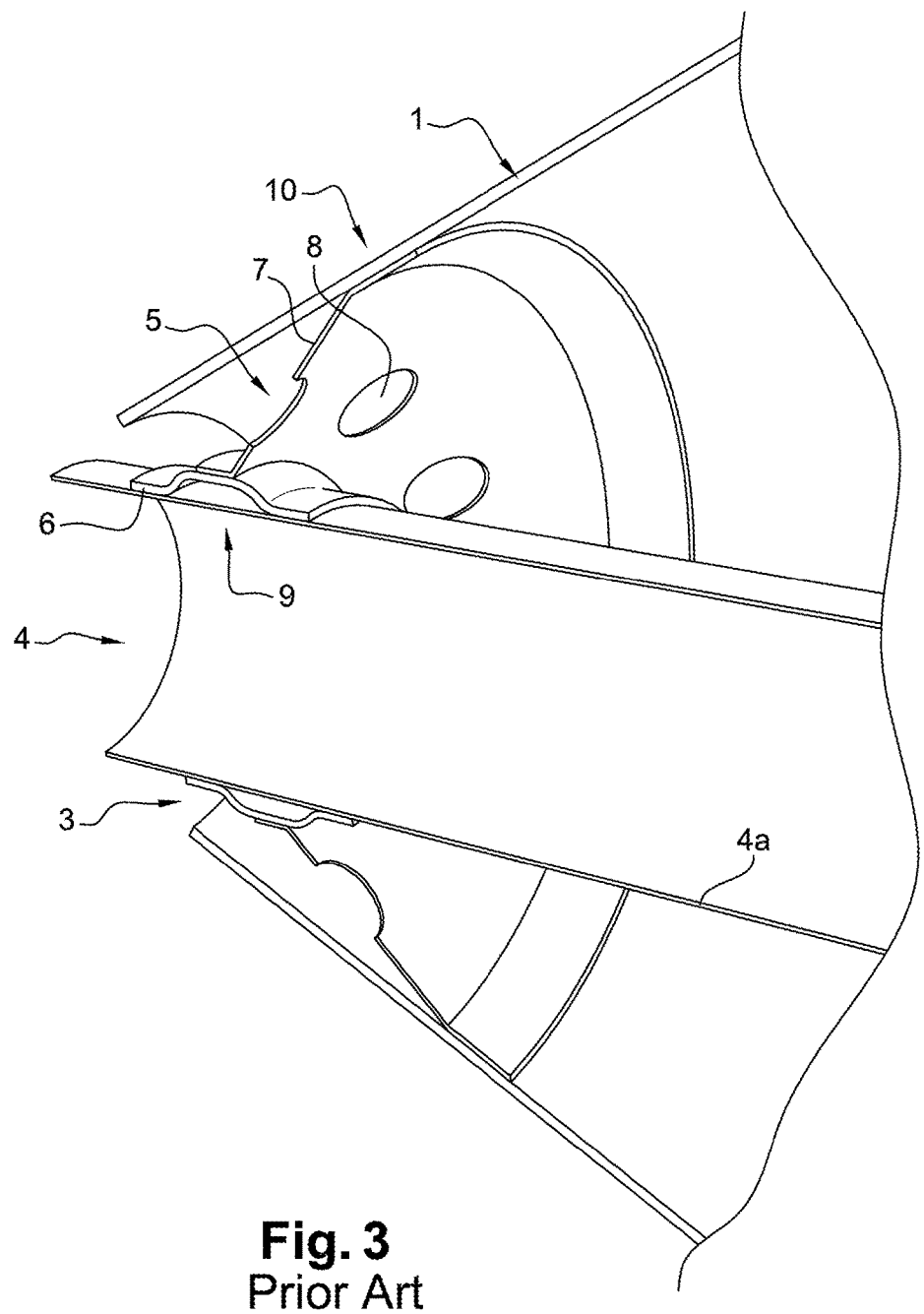
FIG. 3 is a partially cutaway perspective view showing the mounting of FIG. 2.
Figure 4:
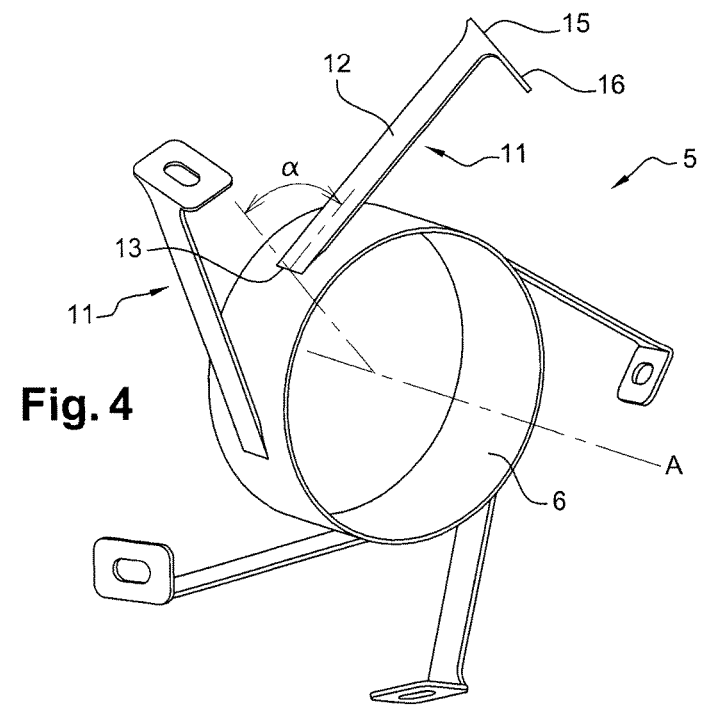
FIG. 4 is a perspective view of a support of the invention.
Figure 5:
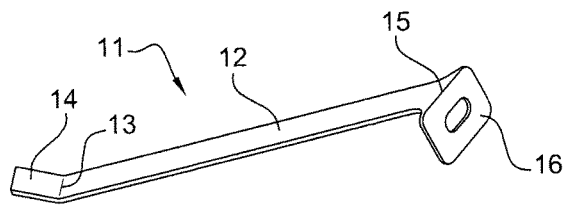
FIG. 5 is a perspective view of a fin of a support of the invention.
Figure 6:
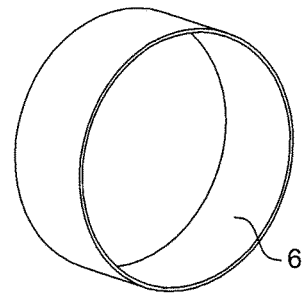
FIG. 6 is a perspective view of an annular portion of the support of the invention.
Figure 7:
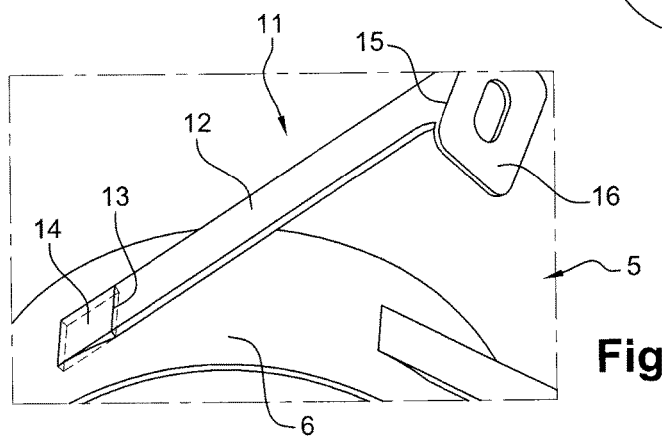
FIG. 7 is a detail view showing how a fin is mounted on said annular portion.
Figure 8:
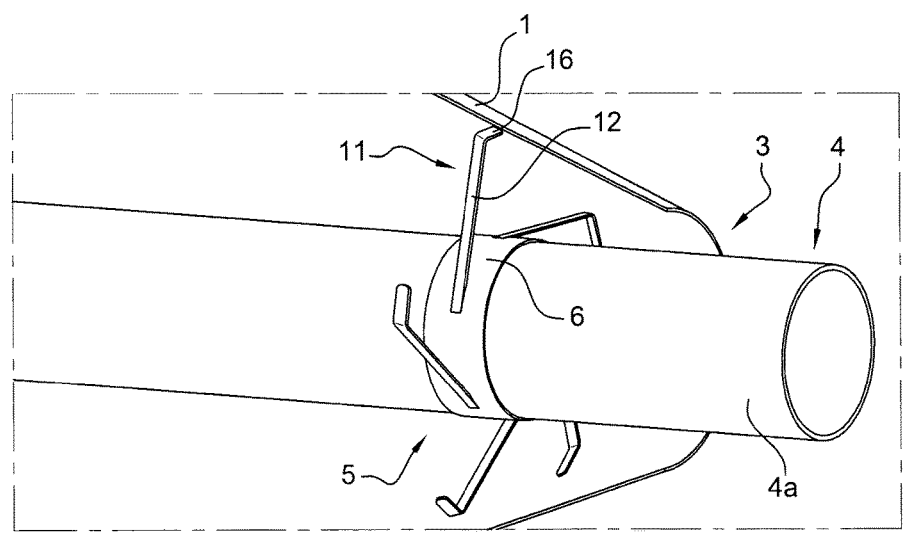
FIG. 8 is a partially cutaway perspective view of a portion of a turbine engine of the invention.

The downstream portion 4a of the tube 4 passes through the exhaust cone 1 and opens out downstream therefrom by passing through the opening 3. Said downstream portion 4a is connected to the exhaust cone 1 by a support 5. This support is visible in FIGS. 2 and 3 and comprises an inner annular portion 6 of generally omega-shaped section surrounding the tube 4, and a conical portion 7 fastened to the exhaust cone 1 and to the inner annular portion 6. The conical portion 7 has holes 8 for passing a flow of cooling air passing through the exhaust cone 1. In addition, the conical portion 7 of the support 5 is fastened to the inner annular portion 6 via screws (not shown).

As mentioned above, the bearing zone 9 where the tube 4 bears against such a support 5 is offset axially from the fastener zone 10 where the support 5 is fastened to the exhaust cone 1, thereby greatly reducing the stiffness of the support 5. This stiffness is further reduced by the presence of the holes 8 for passing the flow of cooling air. Furthermore, such a support 5 is relatively heavy, thereby increasing the total weight of the turbine engine, and it is also expensive.

In order to remedy those drawbacks, the invention proposes connecting the downstream portion 4a of the tube 4 to the exhaust cone 1 by means of the support 5 shown in FIGS. 4 to 8. This support 5 has a radially inner cylindrical annular portion 6 that is for mounting around said tube 4, and fins 11 extending outwards in a radial plane from the annular portion 6, the fins forming an angle α with the radial direction. The number of fins 11 may lie in the range three to ten, for example.

Each fin 11 has a middle zone 12 with a first end 13 connected to an inner fastener zone 14 for fastening axially to the middle of the inner annular portion 6 of the support 5, and a second end 15 connected to an outer fastener zone 16 for fastening to the exhaust cone 1, e.g. by screw fastening, riveting, or brazing. The middle zone 12 extends in a plane forming an angle that is not a right angle relative to the tangent to the annular portion 6 at the first end 13. Furthermore, each middle zone 12 extends in a plane parallel to the axis A of the inner annular portion 6.

In addition, the outer fastener zone 16 is in the form of a portion of a cone that is complementary to the inside surface of the exhaust cone 1, and the inner fastener zone 14 is of a shape that is complementary to the shape of the inner annular portion 6.

The annular portion 6 may also have chamfers facing radially inwards at its ends so as to avoid damaging the tube 4 while the support 5 is being mounted.

The fins 11 and the inner annular portion 6 are preferably made of a nickel-based superalloy, for example out of Inconel 625 (NiCr22Mo9Nb) or of Inconel 718, and the inner fastener zone 14 of the fins 11 are brazed onto the inner annular portion 6. In addition, the length of the inner annular portion 6 is less than or equal to 0.4 times its inside diameter. In this way, the inner angular portion 6 constitutes a short guide forming a kind of ball joint connection between the tube 4 and the support 5. The tube 4 is also mounted free to move in rotation and in axial translation in the inner annular portion 6. These various degrees of freedom make it possible in particular to compensate for any deformation in operation, e.g. due to mechanical and thermal stresses.

It may be observed that in the support 5 of the invention, the zone where the tube 4 bears against the support 5 is situated axially in register with the zone where the support 5 is fastened to the exhaust cone 1, thus enabling the support 5 to present good stiffness. The fact that the fins 11 slope relative to the radial direction also makes it possible to accommodate appropriately the effects of thermal expansion that can arise in operation. Finally, such a support 5 is relatively lightweight, it allows cooling air to pass through the exhaust cone 1, and it is inexpensive. By way of comparison, such a support 5 weighs about one-tenth of the weight of the prior art support shown in FIGS. 2 and 3.

The invention claimed is:

1. A support for carrying a tube for discharging oil-laden air from a turbine engine, the support comprising:
a radially inner annular portion for mounting around said tube; and
fins extending outwards in a radial plane from the annular portion, a length of each fin being coplanar with one another, each fin forming an angle relative to a radial direction, outer peripheries of the fins having outer fastener zones, said outer fastener zones being inclined in an axial direction of the support so as to be suitable for fastening to an exhaust cone of the turbine engine,
wherein each of the outer fastener zones is configured to extend towards a tapered end of the exhaust cone, and
wherein each fin includes a middle zone with a first end connected to an inner fastener zone for fastening to the inner annular portion of the support, and a second end connected to the outer fastener zone for fastening to the exhaust cone, the middle zone being planar and extending from the inner annular portion of the support in a plane forming an angle that is not a right angle with a tangent to the annular portion passing through the first end.

2. The support according to claim 1, wherein each of the outer fastener zones presents a shape of a portion of a cone.

3. The support according to claim 1, wherein each middle zone extends in a plane parallel to an axis of the inner annular portion.

4. The support according to claim 1, wherein each inner fastener zone is of a shape complementary to the shape of the inner annular portion.

5. The support according to claim 1, wherein the fins and the inner annular portion are made of a nickel-based superalloy.

6. The support according to claim 1, wherein a length of the inner annular portion is less than or equal to 0.4 times an inside diameter of the inner annular portion.

7. The support according to claim 1, comprising three to ten fins.

8. An assembly for a turbine engine comprising:
a support according to claim 1; and
a tube for discharging oil-laden air from a turbine engine, said tube comprising an upstream portion that is movable in rotation and a downstream portion that does not rotate, said downstream portion passing through an exhaust cone and extending along an axis of said exhaust cone, said downstream portion being surrounded by the inner annular portion of the support so that said downstream portion is mounted to be free to move axially in translation and in rotation in said inner annular portion, the outer fastener zones of the support also being fastened to the exhaust cone.

9. A turbine engine comprising an assembly according to claim 8.

* * * * *